(12) United States Patent
Kolpasky

(10) Patent No.: US 6,676,223 B2
(45) Date of Patent: Jan. 13, 2004

(54) AUTOMOTIVE WHEEL HAVING A FOOT STEP

(75) Inventor: Kevin G. Kolpasky, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/132,778

(22) Filed: Apr. 25, 2002

(65) Prior Publication Data

US 2003/0201664 A1 Oct. 30, 2003

(51) Int. Cl.$^7$ .............. B60B 7/04; B60B 27/00; B60R 3/00
(52) U.S. Cl. .......... 301/5.1; 301/5.1; 301/108.4; 280/165
(58) Field of Search .............. 301/5.1, 37.101, 301/37.25, 37.28, 37.102, 37.371, 108.1, 108.4; 280/163, 164.1, 165

(56) References Cited

U.S. PATENT DOCUMENTS

| | | | | |
|---|---|---|---|---|
| 1,149,338 A | * | 8/1915 | Butcher | 280/165 |
| 2,218,060 A | * | 10/1940 | Watson | 280/165 |
| 3,288,488 A | * | 11/1966 | Shinn | 280/165 |
| 3,734,534 A | * | 5/1973 | Brooks et al. | 280/163 |
| 3,773,355 A | * | 11/1973 | Swartz | 280/291 |
| 4,440,411 A | * | 4/1984 | Hess | 280/165 |
| 5,456,479 A | * | 10/1995 | Conger | 280/165 |
| 5,634,694 A | * | 6/1997 | Murray et al. | 301/63.103 |
| 6,457,558 B1 | * | 10/2002 | Ehnes | 182/150 |

OTHER PUBLICATIONS

Tire Step product sheets of AutoSport, Charlottesville, VA 22906, 2 pages. First public date unknown.
Tire Step product sheets of Proline Products, Inc., Wallingford, CT 06492, 4 pages. First publication date unknown.
"TIRE–HOPPER" Tire Step product sheets of Top Line Mfg., Paramount, CA, 2 pages. First publication date unknown.

* cited by examiner

Primary Examiner—S. Joseph Morano
Assistant Examiner—Jason R. Bellinger
(74) Attorney, Agent, or Firm—Laura C. Hargitt

(57) ABSTRACT

An automotive wheel incorporating a selectively retractable foot step. The wheel has a wheel opening defined by a wheel opening periphery. Located at the opening is a pedestal having a disk, the periphery of which is rotatably interfaced with the wheel opening periphery. A step is pivotally mounted to the pedestal. The disk has a disk cut-out configured for receiving therein the step. The step is pivotal from a retracted position whereat the step is parallel to the disk and received in the disk cut-out, to a deployed position whereat the step is perpendicular to the disk. A retainer is used to selectively hold the step at the retracted position.

17 Claims, 4 Drawing Sheets

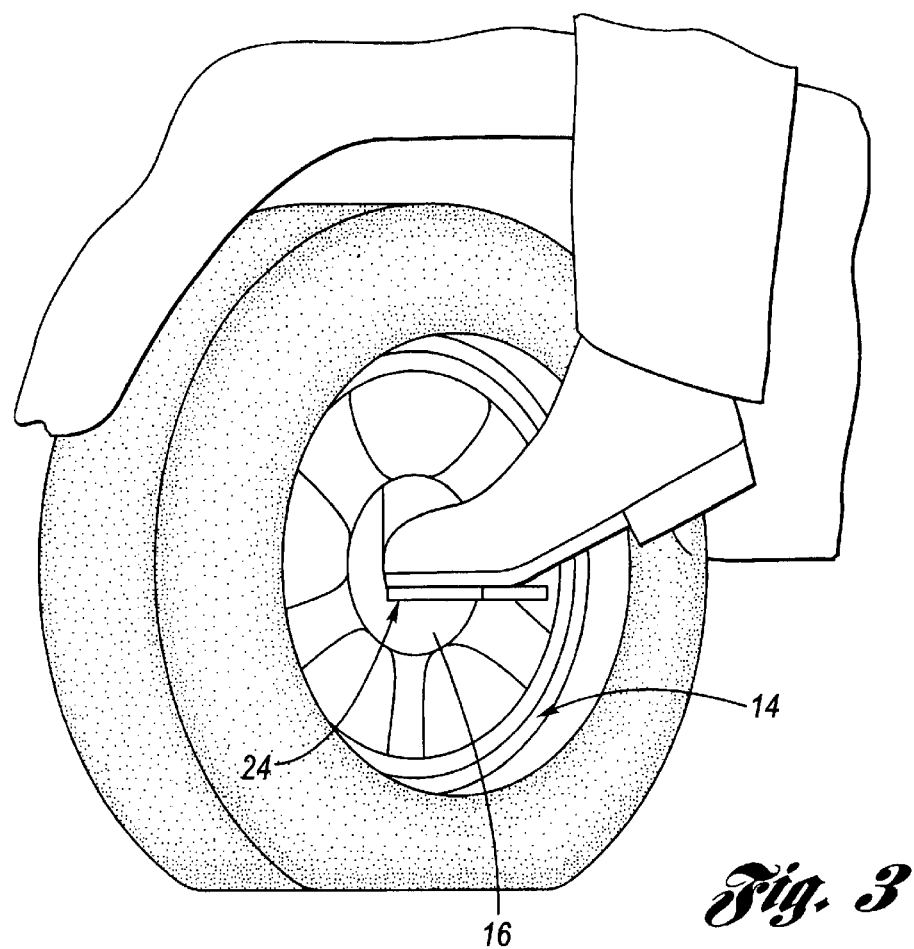
Fig. 3
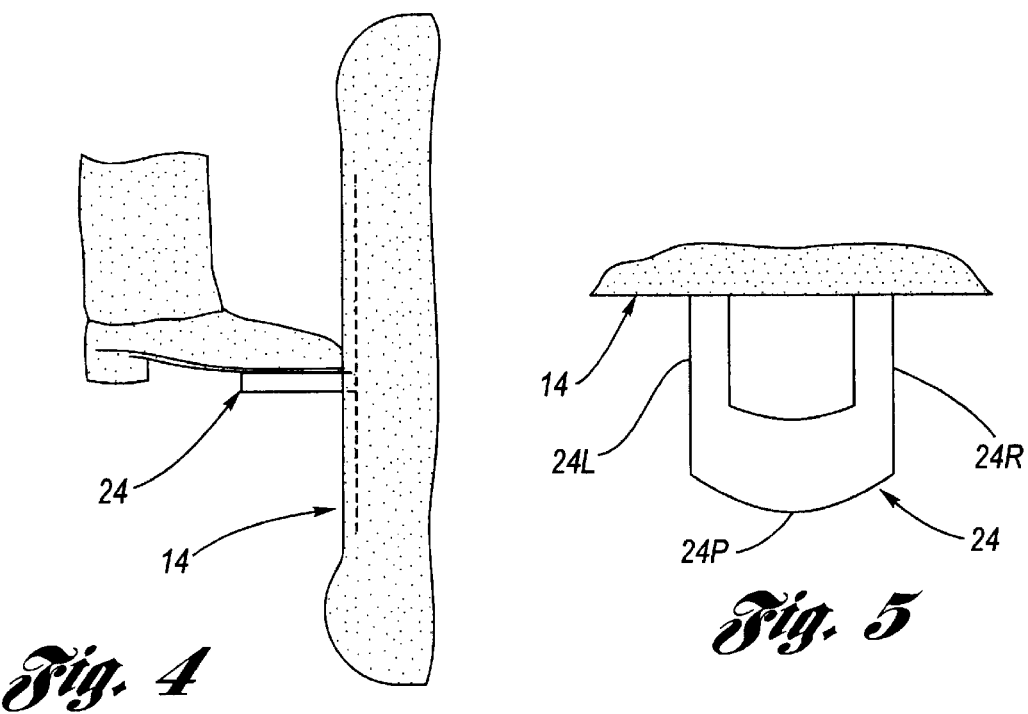
Fig. 4
Fig. 5

AUTOMOTIVE WHEEL HAVING A FOOT STEP

TECHNICAL FIELD

The present invention relates to automotive vehicles, and more particularly to the wheels thereof. Still more particularly, the present invention relates to an automotive wheel having incorporated a selectively retractable foot step.

BACKGROUND OF THE INVENTION

Situations frequently arise when a bystander needs to access portions of a motor vehicle over the fender. For example, there may be a need to inspect or service the engine, a need to reach into the cargo bed, or a need to reach up to the overhead cargo racks. In this regard, larger automotive vehicles, such as for example, vans, sport utility vehicles and pick-up trucks, generally have high ground clearance and high uppermost height of the fenders. This height results in inconvenience and/or difficulty for a bystander who is standing on the ground to access parts of the motor vehicle over the fenders. Some pick-ups have a step formed in the fenders on one side of the wheel well; some vehicles have running boards, and some vehicles have a step at the bumper. However, these provisions do not assist a person to access areas over the fenders directly above the wheel wells. Because of this, a bystander who needs to access parts of the motor vehicle over the fenders and above the wheel wells may need to utilize some object to stand upon (if one can be found).

Because the wheel well area is a vehicular location frequently used by bystanders to access parts of the vehicle located over the fenders, it would be most beneficial if somehow the vehicle, itself, could provide a step where the wheel is located.

SUMMARY OF THE INVENTION

The present invention is an automotive wheel incorporating a selectively retractable foot step.

An automotive wheel has a centrally disposed, circular wheel opening defined by a wheel opening periphery. A pedestal, composed of a drum and a disk integrally connected to the drum, is located at the wheel opening, wherein the disk has a disk periphery which is rotatably interfaced with the wheel opening periphery. A step is pivotally connected to the pedestal. The disk has a disk cut-out configured for receiving therein the step. The step is pivotal from a retracted position whereat the step is parallel to the disk (that is, parallel to the plane of the wheel) and received in the disk cut-out, to a deployed position whereat the step is perpendicular to the disk.

A retainer is used to selectively hold the step at the retracted position. When the step is at the deployed position, a user may use the step as a safe and secure foot step to access parts of the vehicle thereabove. Further, when the step is at the deployed position, the lug nuts are accessible through the disk cut-out for removal or installation of the wheel with respect to the axle hub.

In a preferred embodiment, the drum is bolted to the axle hub, wherein the disk periphery slides on the wheel opening periphery. In operation a user places the step into the deployed position, and then manually rotates the step into a horizontal attitude for being used as a foot step.

In an alternative embodiment, the drum is mounted to the axle hub via a bearing, and the disk is weighted so that gravity always causes the step to assume a horizontal attitude. In operation, all the user need do is pivot the step to the deployed position for using it as a foot step.

Accordingly, it is an object of the present invention to provide a selectively retractable foot step integrated with an automotive wheel.

This and additional objects, features and advantages of the present invention will become clearer from the following specification of preferred embodiments.

BRIEF DESCRIPTION OF THE DRAWINGS

FIG. 3 is a perspective view of the retractable foot step, showing the step at the deployed position and being operationally used as a foot step.

FIG. 4 is a broken-away end view of the retractable foot step, showing the step at the deployed position and being operationally used as a foot step.

FIG. 5 is a broken-away top view of the retractable foot step, shown with the step at the deployed position.

DESCRIPTION OF THE PREFERRED EMBODIMENT

Figure 1:
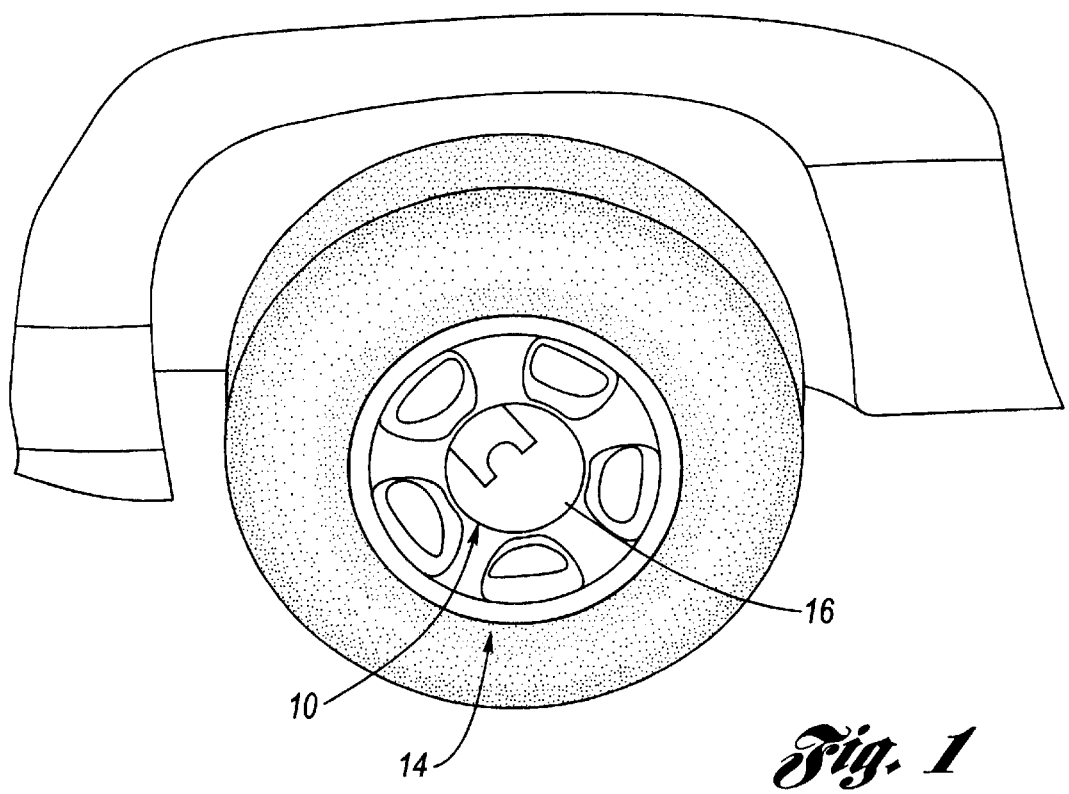
FIG. 1 is a side view of an automotive wheel equipped with a retractable foot, step according to the present invention, shown in operation with respect to a motor vehicle.

Referring now to the Drawing, FIGS. 1 through 7 depict an example of a retractable foot step 10 according to the present invention. The retractable foot step 10 includes a pedestal 12 (shown at FIG. 6) located at a central portion of a wheel 14. The pedestal 12 includes a disk 16 and a drum 26 which are preferably integrally formed as a single piece. The disk 16 has a circular disk periphery 18. The wheel 14 has a central opening 20 (see FIGS. 6 and 7) defined by a wheel opening periphery 22, which is slidably interfaced with the disk periphery 18 such that the pedestal is freely rotatable with respect to the wheel. A step 24 is pivotally connected to the pedestal 12.

Figures 2A, 2B:
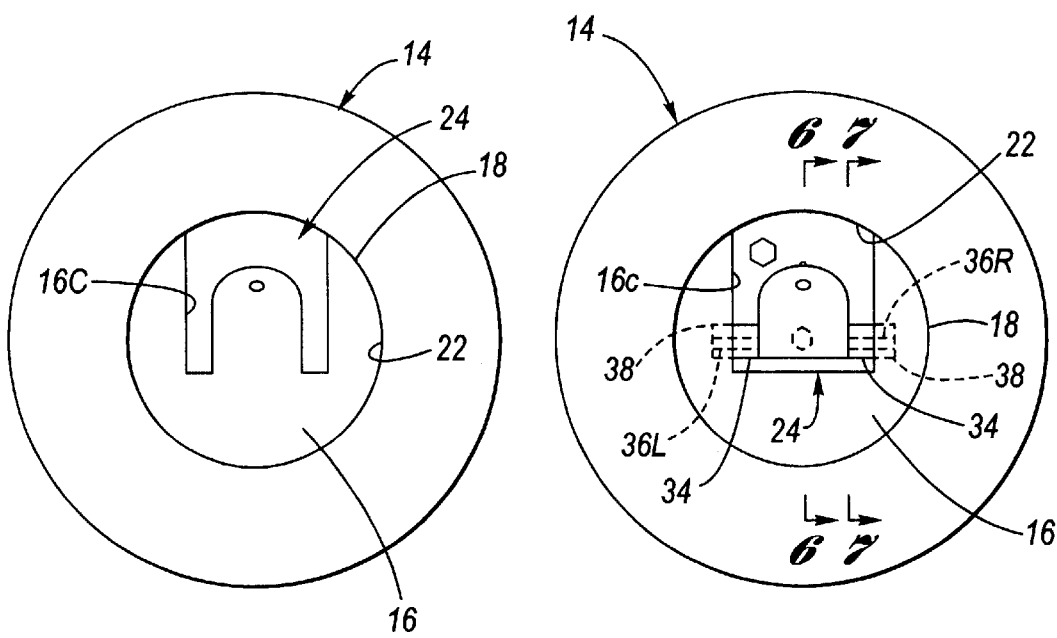
FIG. 2A is a side view of the retractable foot step, shown with the step at the retracted position.
FIG. 2B is a side view of the retractable foot step, shown with the step at the deployed position.

The disk 16 has a disk cut-out 16C having a shape complementary to the shape of the step 24 such that the step is received into the disk cut-out when pivoted to an orientation parallel to the disk (parallel to the wheel plane P in FIG. 6), referred to herein as the retracted position, as shown at FIGS. 1 and 2A. The step 24 is pivotal from the retracted position to a deployed position whereat the step is perpendicular to the step assembly disk 16 (perpendicular to the wheel plane), as shown at FIGS. 2B and 5. When at the deployed position, the step 24 serves as a convenient and sturdy foot step for a user to step upon and thereby gain increased height to access portions of the vehicle thereabove, as generally shown at FIGS. 3 and 4.

Figure 6:
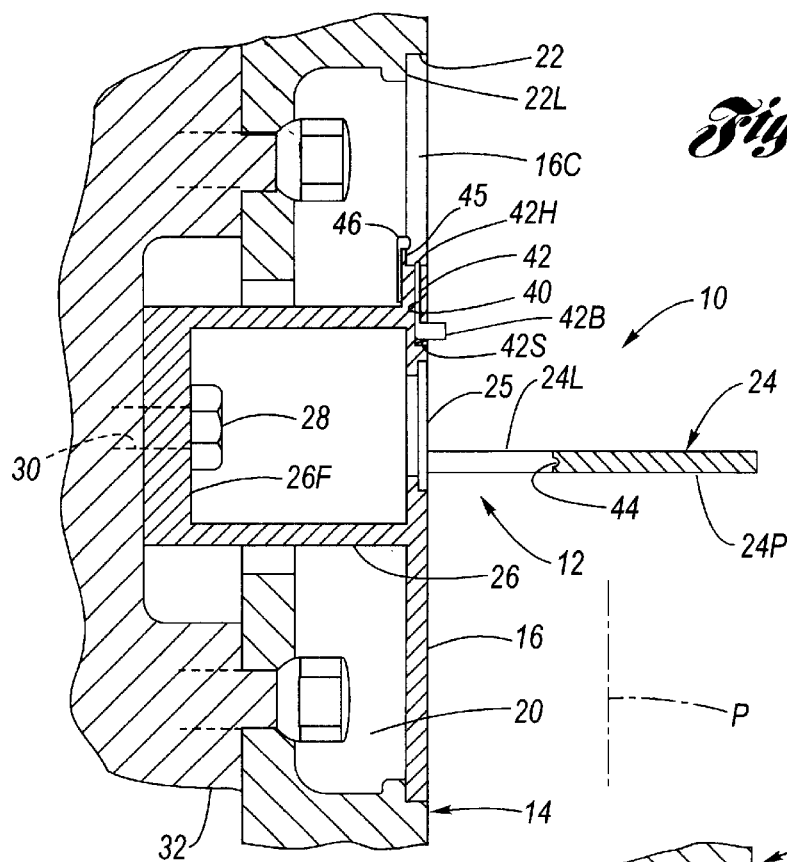
FIG. 6 is a partly sectional view taken along line 6—6 in FIG. 2B.
Figure 7:
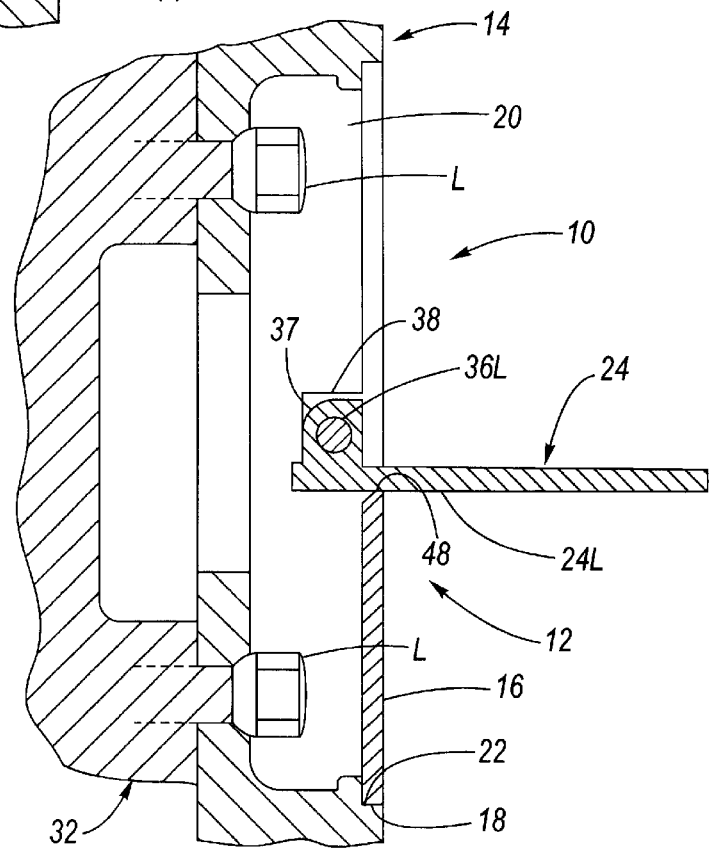
FIG. 7 is a partly sectional view taken along line 7—7 in FIG. 2B.

Referring additionally now to FIGS. 6 and 7 structural aspects of the preferred embodiment of the retractable foot step 10 will be detailed.

It is preferred for the aforementioned peripheral interface of the disk periphery 18 with the wheel opening periphery 22 to be in the form of the wheel opening periphery having an inner lip 22L which serves as a mechanical locating feature and slide surface between the wheel and the disk. The drum 26 has a floor 26F through which passes a mounting bolt 28 that threads into a threaded hole 30 in the axle hub 32, whereby the disk 16 is rotatably mounted to the axle hub and, consequently, rotatable with respect to the wheel 14. Alternatively, the mounting bolt may be threadably engaged with the wheel if the wheel has a continuous center portion, rather than a central aperture as shown at FIG. 6. An access panel 25 provides easy accessibility to the mounting bolt 28 for removal and installation purposes.

It is preferred for the step 24 to have a U-shape defined by left and right step arms 24L, 24R which are mutually connected at a distal end thereof by a platform 24P as shown in FIG. 5. The near ends of the left and right step arms 24L, 24R, respectively, have a perpendicularly projecting ledge 34. As shown in FIG. 2B, the step 24 is pivotally connected to the pedestal 12 via a respective pivot pin 36L, 36R passing through the ledge 34 of each of the left and right step arms 24L, 24R and through an adjacent mounting block 38, which is integrally connected with the disk 16 (for example a nut threaded onto a bushing lined bolt). Alternatively, or in addition, the pivot pins may pass into the drum.

A retainer keeps the step 24 at the retracted position. FIG. 6 shows a preferred retainer in the form of a spring loaded retainer pin 42 which is slidable in a pin guide passage 40 formed in the pedestal 12. The retainer pin 42 has a pin head 42H and a pin release button 42B, wherein a spring 42S biases the pin head upwardly toward the disk cut-out 16C. When the step 24 is pivoted to the retracted position, the pin head 42H enters into a pin seat 44 of the step platform 24P so as to interfere with pivoting of the step out from the retracted position unless the release button 42B is intentionally depressed in opposition to spring biasing of the retainer pin. A locating tab 45 provides location of the step 24 with respect to the disk 16A with respect to the retracted position. A spring steel release 46 may be mounted to the step assembly disk 16 which serves to bias the step 24 when it is placed into the retracted position, wherein the biasing provides a spring force to kick-out the step from the retracted position as soon as the pin head 42H has been depressed.

In operation, a user depresses the pin release button 42B, whereupon the step 24 kicks-out and is then moved into the fully deployed position. At the fully deployed position, if the step is not already horizontal, the user then grabs the step and rotates it relative to the wheel 14 so that it is brought into a reasonably horizontal attitude. The interaction of the pivot pins 36L, 36R vis-a-vis the left and right step arms 24L, 24R abutting a bottom edge 48 of the disk cut-out 16C of the step assembly disk 16, provide a stable support for the user to step upon as shown at FIGS. 3 and 4.

With the step 24 at the deployed position, the disk cut-out 16C provides an opening through the disk 16 of ample size for a lug wrench to successively engage all the lug nuts L by simply rotating the pedestal successively as needed for access to each.

After using the step, the user simply pivots it back to the retracted position, whereupon the retainer automatically retentively engages the step.

Figure 8:
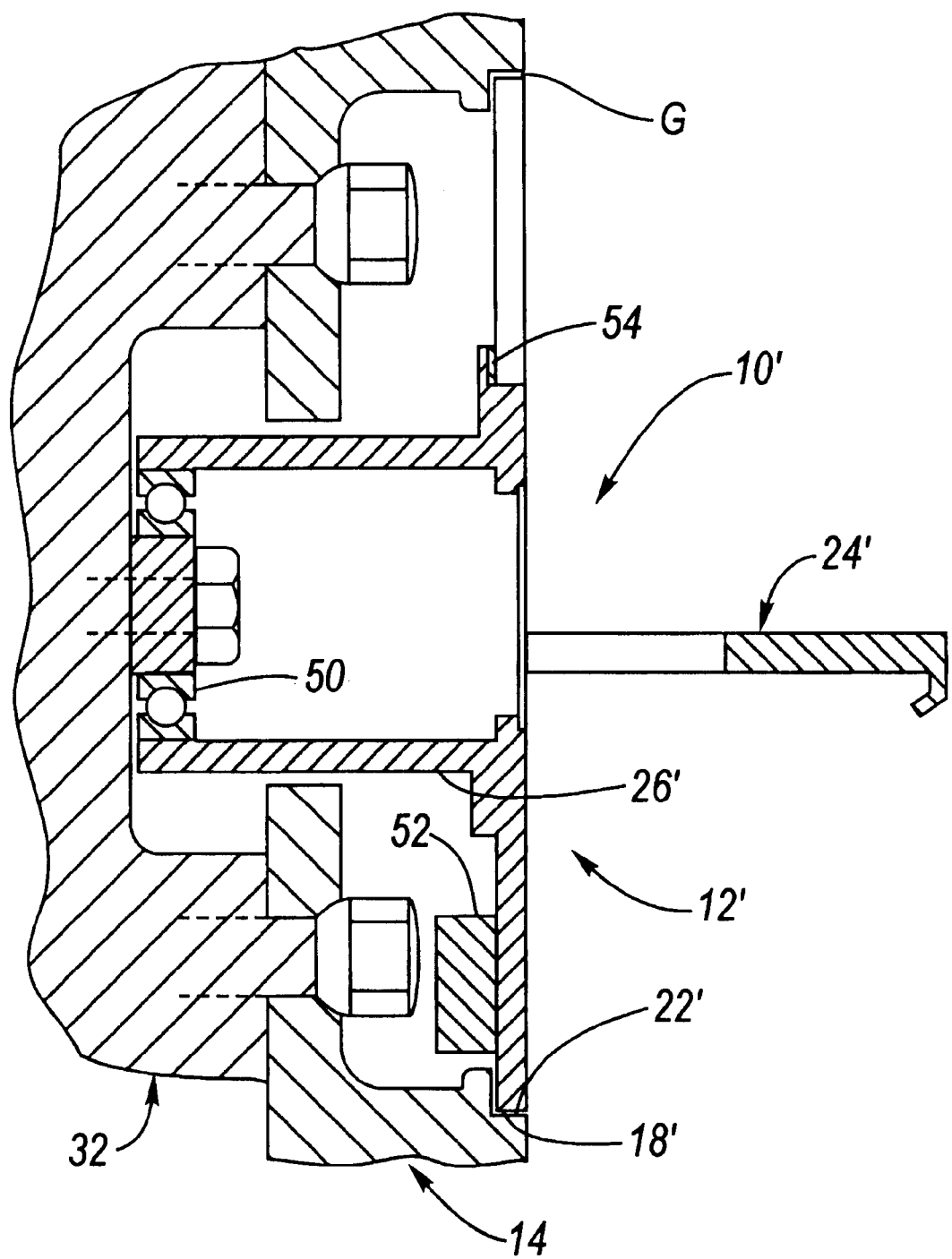
FIG. 8 is a partly sectional view of an alternative embodiment of a retractable foot step according to the present invention, seen taken from a vantage similar to that taken at FIG. 6.

FIG. 8 depicts a variation of the retractable foot step 10', having a pedestal 12' and pivotally mounted step 24, wherein like numbers indicate like parts to those mentioned with regard to FIGS. 6 and 7. Now, the pedestal 12' has a low friction bearing (ie., a roller or ball bearing) 50 which interconnects the drum 26' to the wheel hub 32 (or to the wheel 14). The periphery interface between the wheel opening periphery 22' and the disk periphery 18' now has a small gap G to eliminate friction therebetween. A weight 52 is attached to the disk 12' at a location vertically below the horizontal plane of the step. The combination of the low friction of the bearing 50 and the tendency of gravity to keep the weight 52 always vertically beneath the bearing, results in the step 24 always having a horizontal attitude. An alternative retainer using a magnet 54 and a handholded step 24' is depicted; however, the aforedescribed retainer using a pin would be more preferable.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A retractable foot step for placement at a wheel of a motor vehicle, comprising:
   an axle having a hub;
   a pedestal rotatably connected to said hub; and
   a step pivotally connected to said pedestal;
   wherein said pedestal comprises:
      a disk having a disk periphery; and
      a drum connected to said disk, said drum being connected to said hub; and
   wherein said disk has a disk cut-out shaped for receiving said step, wherein said step is pivotable from a retracted position, in which said step is parallel to said disk and is received in said disk cut-out, to a deployed position, in which said step is oriented perpendicular to said disk.

2. The retractable foot step of claim 1, further comprising a retainer for selectively retaining said step at the retracted position.

3. The retractable foot step of claim 2, wherein said step has a U-shaped configuration.

4. The retractable foot step of claim 3, wherein a low friction bearing rotatably connects said drum to said hub, and further comprising a weight connected to said disk at a location vertically below said step when said step is at the deployed position in a horizontal attitude.

5. A retractable foot step interfaced with a wheel, comprising:
   a wheel having a central portion; and
   a retractable foot step located at said central portion of said wheel, said retractable foot step comprising:
      a pedestal located at said central portion; and
      a step pivotally connected to said pedestal;
   wherein said central portion includes a central opening defined by a circular wheel opening periphery and said pedestal comprising:
      a disk having a circular disk periphery; and
      a drum connected to said disk;
      wherein said disk periphery rotatably interfaces with said wheel opening periphery.

6. The retractable foot step and wheel of claim 5, wherein a low friction bearing rotatably connects said drum to said hub, and further comprising a weight connected to said disk at a location vertically below said step when said step is at the deployed position in a horizontal attitude.

7. The retractable foot step and wheel of claim 5, wherein said disk has a disk cut-out shaped for receiving said step, wherein said step is pivotable from a retracted position, in which said step is parallel to said disk and is received in said disk cut-out, to a deployed position, in which said step is oriented perpendicular to said disk.

8. The retractable foot step and wheel of claim 7, further comprising a retainer for selectively retaining said step at the retracted position.

9. The retractable foot step and wheel of claim 8, wherein said step has a U-shaped configuration.

10. A motor vehicle having at least one wheel equipped with a retractable foot step, comprising:

an axle having a hub;

a wheel having a central portion, said wheel being connected to said hub; and a retractable foot step located at said central portion of said wheel, said retractable foot step comprising:
 a pedestal located at said central portion; and
 a step pivotally connected to said pedestal;

wherein said central portion includes a central opening defined by a circular wheel opening periphery and said pedestal comprising:
 a disk having a circular disk periphery; and
 a drum connected to said disk;
  wherein said disk periphery rotatably interfaces with said wheel opening periphery.

11. The motor vehicle of claim 10, wherein said disk has a disk cut-out shaped for receiving said step, wherein said step is pivotable from a retracted position, in which said step is parallel to said disk and is received in said disk cut-out, to a deployed position, in which said step is oriented perpendicular to said disk.

12. The motor vehicle of claim 11, further comprising a retainer for selectively retaining said step at the retracted position.

13. The motor vehicle of claim 12, wherein said step has a U-shaped configuration.

14. The motor vehicle of claim 13, wherein said drum is rotatably connected to said hub.

15. The motor vehicle of claim 14, wherein said wheel is connected to said hub by a plurality of lug nuts, wherein said lug nuts are successively accessible when said step is at the deployed position by successive rotational movements of said pedestal relative to said wheel.

16. The motor vehicle of claim 13, wherein a low friction bearing connects said drum to said hub, and further comprising a weight connected to said disk at a location vertically below said step when said step is at the deployed position in a horizontal attitude.

17. The motor vehicle of claim 16, wherein said wheel is connected to said hub by a plurality of lug nuts, wherein said lug nuts are successively accessible when said step is at the deployed position by successive rotational movements of said pedestal relative to said wheel.

* * * * *